United States Patent
Chen

(10) Patent No.: US 10,834,126 B2
(45) Date of Patent: Nov. 10, 2020

(54) METHOD AND SYSTEM FOR PROCESSING FORGED TCP PACKET

(71) Applicant: WANGSU SCIENCE & TECHNOLOGY CO., LTD., Shanghai (CN)

(72) Inventor: Hong Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 226 days.

(21) Appl. No.: 16/068,797

(22) PCT Filed: Oct. 31, 2016

(86) PCT No.: PCT/CN2016/104103
§ 371 (c)(1),
(2) Date: Jul. 9, 2018

(87) PCT Pub. No.: WO2018/035962
PCT Pub. Date: Mar. 1, 2018

(65) Prior Publication Data
US 2019/0020681 A1  Jan. 17, 2019

(30) Foreign Application Priority Data

Aug. 26, 2016  (CN) .......................... 2016 1 0743506

(51) Int. Cl.
*H04L 29/06* (2006.01)
*H04L 12/26* (2006.01)
(Continued)

(52) U.S. Cl.
CPC .......... *H04L 63/1466* (2013.01); *H04L 29/06* (2013.01); *H04L 43/16* (2013.01);
(Continued)

(58) Field of Classification Search
None
See application file for complete search history.

(56) References Cited

U.S. PATENT DOCUMENTS 7,496,662 B1 * 2/2009 Roesch ............... H04L 63/1433
 709/223
7,607,170 B2  10/2009 Chesla
(Continued)

FOREIGN PATENT DOCUMENTS

CN  101989985 A  3/2011
CN  102655509 A  9/2012
(Continued)

OTHER PUBLICATIONS

The European Patent Office (EPO) The Extended European Search Report for 16913982.1 (PCT/CN2016/104103) dated May 16, 2019 7 Pages.

(Continued)

*Primary Examiner* — Henry Tsang
(74) *Attorney, Agent, or Firm* — Anova Law Group, PLLC

(57) ABSTRACT

A method for processing forged TCP packets is provided. The method utilizes a window size field in a header of a to-be-processed TCP packet and a window scaling factor to calculate a receive window value of the TCP packet for comparison with an actual receive window value. Further, based on a degree of deviation between the comparison result and a threshold, whether the to-be-processed TCP packet is forged is determined, such that the probability of finding and discarding the forged TCP packet is improved.

17 Claims, 4 Drawing Sheets

(51) Int. Cl.
*H04L 12/801* (2013.01)
*H04L 12/807* (2013.01)

(52) U.S. Cl.
CPC ............ *H04L 47/193* (2013.01); *H04L 47/27* (2013.01); *H04L 47/34* (2013.01); *H04L 63/0227* (2013.01); *H04L 63/126* (2013.01); *H04L 69/16* (2013.01)

(56) References Cited

U.S. PATENT DOCUMENTS

| | | | | |
|---|---|---|---|---|
| 8,363,549 | B1 * | 1/2013 | Zhu | H04L 63/0218 370/225 |
| 8,811,419 | B2 | 8/2014 | Isobe | |
| 9,253,104 | B2 | 2/2016 | Jin et al. | |
| 2005/0216954 | A1 * | 9/2005 | Ramaiah | H04L 63/1458 726/22 |
| 2006/0075482 | A1 * | 4/2006 | Appanna | H04L 69/163 726/14 |
| 2016/0014126 | A1 * | 1/2016 | Jalan | H04L 63/1458 726/7 |
| 2016/0261722 | A1 * | 9/2016 | Paasch | H04L 69/14 |

FOREIGN PATENT DOCUMENTS

| | | |
|---|---|---|
| CN | 105847283 A | 8/2016 |
| CN | 106101161 A | 11/2016 |
| WO | 2009059545 A1 | 5/2009 |

OTHER PUBLICATIONS

The World Intellectual Property Organization (WIPO) International Search Report for PCT/CN2016/104103 dated May 31, 2017 5 Pages (including translation).

* cited by examiner

| Kind=3 | Length=3 | shift.cnt |

FIG. 3 (Prior Art)

| Key value | Connection tetrad | Actual receive window | Receive window scaling factor | Creation time |

FIG. 4

METHOD AND SYSTEM FOR PROCESSING FORGED TCP PACKET

CROSS-REFERENCES TO RELATED APPLICATIONS

This application is a national phase entry under 35 U.S.C § 371 of International Application No. PCT/CN2016/104103 filed on Oct. 31, 2016, which claims priority of Chinese Patent Application No. 201610743506.0, filed with the State Intellectual Property Office of P. R. China on Aug. 26, 2016, the entire contents of all of which are incorporated herein by reference.

FIELD OF THE DISCLOSURE

The present disclosure generally relates to the technical field of network safety and, more particularly, relates to a method and a system for processing forged TCP packets.

BACKGROUND

TCP (Transmission Control Protocol) is a connection-oriented and reliable transport layer communication protocol based on byte stream. TCP may be the most basic protocol of the Internet, and is the basis of the Internet. As the network technology develops, for various purposes, more and more attackers have started to utilize vulnerabilities of the TCP protocol to attack the network. For example, a common attacking approach is to forge the TCP packet. As an example, the client may establish a connection with the server after the TCP three-way handshake; later, the client may send a request packet to the server; a hijacking device may listen for the request packet via a listening device and send a forged acknowledgement packet to the client; if no process is performed, the forged acknowledgement packet may arrive at the client earlier than a valid acknowledgement packet from the server, thereby replacing the server to communicate with the client. In such way, hijacking of the client is realized, which makes the client to believe it is communicating with the server while, in fact, communication is between the client and the hijacking device.

To improve the network safety and avoid the occurrence of the hijacking situations, the user requests higher requirements on the detection of network attacking by the forged TCP packet. In existing technology, methods such as examining whether the TTL (time to live) field of the IP packet header is reasonable, or whether the identification field is regular, are often used to find and discard the forged TCP packet. However, such methods are either too complicated to implement because detection is needed to improve the accuracy, or they show a low accuracy due to the simplified processing, which easily leads to misjudgment or omission of judgment. Thus, there is a need for developing a method that rapidly and conveniently processes the forged TCP packet with high accuracy.

BRIEF SUMMARY OF THE DISCLOSURE

The present disclosure provides an improved method for processing forged TCP packet, comprising:
  receiving a to-be-processed TCP packet, where a header of the to-be-processed TCP packet includes a window size field;
  based on the to-be-processed TCP packet, searching a TCP receive window reference table to find out whether a record related to the to-be-processed TCP packet exists;
  if a record related to the to-be-processed TCP packet exists in the TCP receive window reference table, calculating a receive window value of the to-be-processed TCP packet from the window size field in the header of the to-be-processed TCP packet and a receive window scaling factor field in the record related to the to-be-processed TCP packet;
  comparing the receive window value of the to-be-processed TCP packet and an actual receive window value in the record related to the to-be-processed TCP packet to obtain a deviation therebetween; and
  comparing the deviation with a preset threshold to determine whether the to-be-processed TCP packet is a forged packet.

In another aspect of the present disclosure, a system for processing forged TCP packet is provided, comprising:
  a device for receiving a to-be-processed TCP packet, where a header of the to-be-processed TCP packet includes a window size field;
  a device for, based on the to-be-processed TCP packet, searching a TCP receive window reference table to find out whether a record related to the to-be-processed TCP packet exists;
  a device for, if a record related to the to-be-processed TCP packet exists in the TCP receive window reference table, calculating a receive window value of the to-be-processed TCP packet from the window size field in the header of the to-be-processed TCP packet and a receive window scaling factor field in the record related to the to-be-processed TCP packet;
  a device for comparing the receive window value of the to-be-processed TCP packet and an actual receive window value in the record related to the to-be-processed TCP packet to obtain a deviation therebetween; and
  a device for comparing the deviation with a preset threshold, where via a comparison result of the device, whether the TCP packet is a forged packet is determined.

The key of the present disclosure lies in the utilization of the window size field in the header of the to-be-processed TCP packet and the window scaling factor to calculate the receive window value of the to-be-processed TCP packet, and in the comparison of the calculated receive window value of the to-be-processed TCP packet with the actual receive window. If a relatively large deviation exists between the receive window value of the to-be-processed TCP packet and the actual receive window value, the to-be-processed TCP packet is determined to be a forged TCP packet and is correspondingly processed.

BRIEF DESCRIPTION OF THE DRAWINGS

From a reading of the following detailed descriptions of embodiments illustrated using non-limiting examples, the present disclosure may be better understood and advantages of the present disclosure may be better reflected. In the accompanying drawings:

FIG. 3 illustrates a structural schematic view of a window scaling factor option carried by a SYN packet (may also referred to as "<SYN> packet") sent during TCP three-way handshake;

FIG. 4 illustrates a structural schematic view of data recorded in a TCP receive window reference table according to embodiments of the present disclosure;

DETAILED DESCRIPTION

To more clearly describe the objectives, technical solutions and advantages of the present disclosure, the present disclosure is further illustrated in detail with reference to the accompanying drawings in conjunction with embodiments.

The present disclosure provides improved method and system for processing forged TCP packets. More specifically, the key point of the present disclosure lies in the utilization of the window size field in the header of the to-be-processed TCP packet and the window scaling factor to calculate the receive window value of the to-be-processed TCP packet, and in comparing the receive window value of the to-be-processed TCP packet with an actual receive window value. Further, based on a degree of deviation between the comparison result and the threshold, whether the to-be-processed TCP packet is forged is determined, thereby improving the probability of finding and further discarding the forged TCP packet. More specifically, in the present disclosure, a TCP receive window reference table that at least includes information of TCP connection tetrad (source IP, source port, destination IP, destination port), actual TCP receive window 'RCV.WND', and TCP receive window scaling factor 'Rcv.Wind.Scale' is established. By ensuring the accuracy of the RCV.WND value corresponding to the TCP connection and utilizing the TCP receive window reference table, the forged TCP packets may have a higher chance to be found (and discarded). Accordingly, the device may receive as few attacks from the forged TCP packets as possible.

Figure 1:
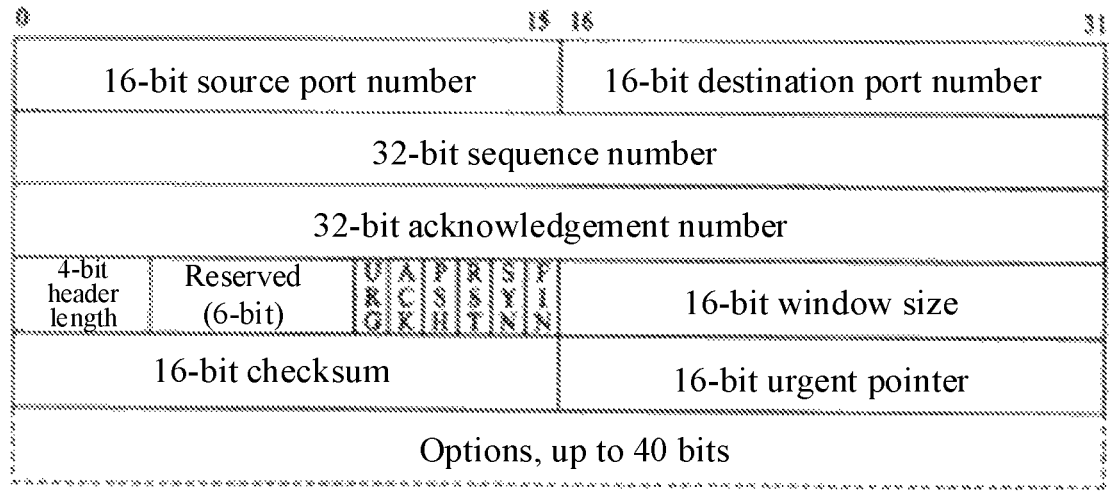
FIG. 1 illustrates a structural schematic view of a header of a TCP packet.

First, as shown in FIG. 1, a structural schematic view of a header of a TCP packet is illustrated. In particular, the 16-bit source port number identifies an application program sent out for transmission on a host, and the 16-bit destination port number identifies an application program transmitted for arrival on the host. The source port number and the destination port number are configured to find application processes at a sending end and a receiving end. Such two values (i.e., the source port number and the destination port number), together with the source IP address and the destination IP address in an IP header, determine a TCP connection. The TCP protocol uses 'ports' to identify the application processes at the source end and the destination end. The port number may use any digit varying from 0 to 65535. When sending a service request, the operating system dynamically allocates a port number for the application program of the client. At the server end, each kind of service provides service to the user at the "Well-Know Port".

The 32-bit sequence number field is configured to identify data byte stream sent by a TCP source end to a TCP destination end, and represents the sequence number of the first data byte in a segment.

For the 32-bit acknowledgement number field, only when the ACK bit is 1, the acknowledgement number field is valid. The 32-bit acknowledgement number field includes the sequence number of a next data byte expected by the destination end to receive from the source end.

The 4-bit header length field gives how many 32 bits (4 bytes) the header includes. The length of the TCP header without any option field is 20 bytes, and the TCP header may have up to 60 bytes.

The 6-bit reserved field includes 6 bits following the data offset field, and the reserved bit is often 0.

The flag field (URG, ACK, PSH, RST, SYN, FIN) occupies 6 bits, and each bit has the following meaning:

URG: the urgent pointer is valid

ACK: the acknowledgement sequence number is valid

PSH: the receiver needs to push the segment to the application layer as soon as possible RST: reset connection SYN: initiate a connection FIN: release a connection The 16-bit receive window size field is used for traffic control, where the unit is byte, and its value is the number of bytes that the host expects to receive at a time.

The 16-bit checksum field is to validate and calculate the entire TCP segment (i.e., TCP header and TCP data), and the validation is performed by the destination end.

The 16-bit urgent pointer field is an offset, and may represent a sequence number of the last byte of the urgent data if added with the value in the sequence number field.

The option field can be up to 40 bytes and may include options such as "window scaling factor", and "timestamp".

In technical solutions of the present disclosure, the receive window size field is labeled as SEG.WND, which represents the receive window of the sending end. TCP completes initialization of the receive windows of the two communication participators through the three-way handshake.

Figure 2:
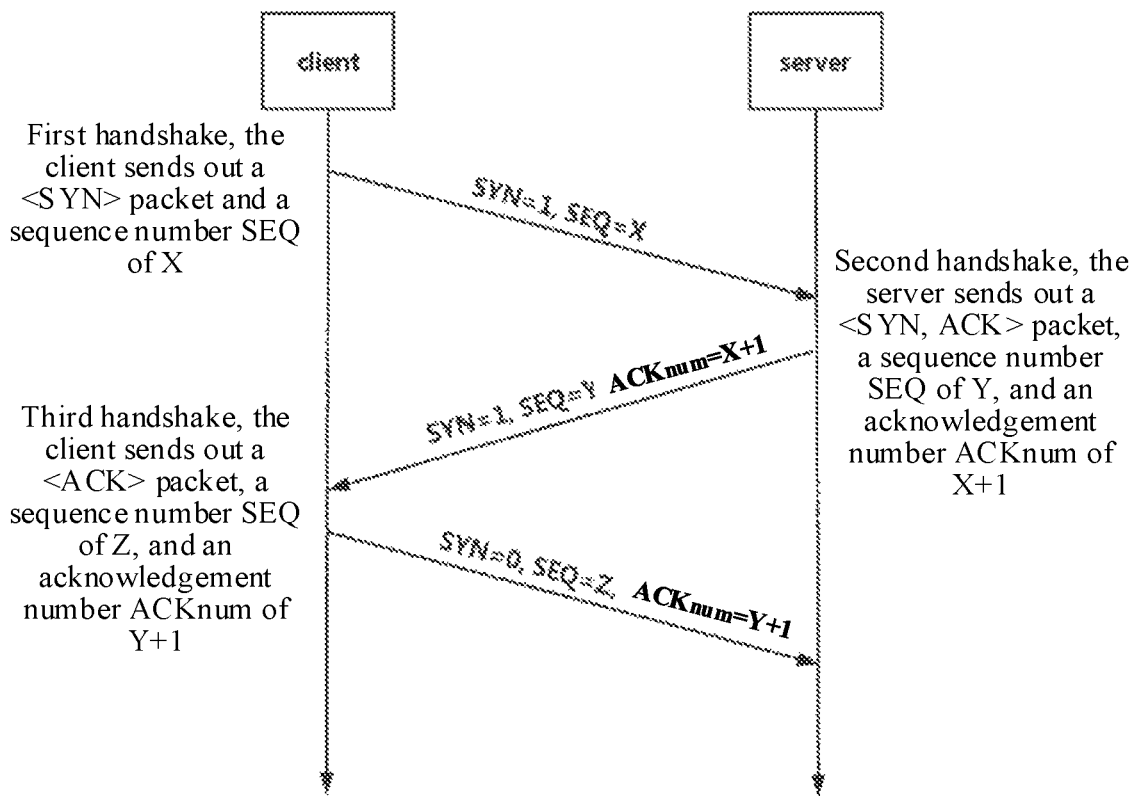
FIG. 2 illustrates a schematic view showing a process of TCP three-way handshake that establish a connection.

In FIG. 2, a schematic view showing a process of TCP three-way handshake is illustrated.

First, in the first handshake, the client generates a <SYN> packet, sets a SYN bit to 1 (i.e., SYN=1), randomly generates a sequence number SEQ=X, and sends the <SYN> packet to the server. Further, the client enters a status of SYN_SENT and waits for acknowledge from the server.

In the second handshake: after receiving the <SYN> packet, the server is informed by SYN=1 that the client requests to establish a connection. The server thus generates a <SYN, ACK> packet, sets a SYN bit to 1, configures an acknowledgement number ACKnum=X+1, and randomly generates a sequence number SEQ=Y. Further, the server sends the <SYN, ACK> packet to the client for acknowledgement of the connection request, and the server enters a status of SYN_RCVD.

In the third handshake: after receiving the acknowledgement (i.e., the <SYN, ACK> packet), the client examines whether the acknowledgement number ACKnum is X+1. If the acknowledgement number ACKnum is X+1, the client generates an <ACK> packet, sets an ACK bit to 1, configures an acknowledgement number ACKnum=Y+1, sets a SYN bit to 0, and randomly generates a sequence number SEQ=Z. Further, the client sends the <ACK> packet to the server, and the server checks whether ACKnum is Y+1. If ACKnum in the <ACK> packet is Y+1, the connection is successful, and the client and the server go into the ESTABLISHED status.

Through the TCP connection established by the three-way handshake, data can be transmitted between the client and the server.

With reference to the aforementioned descriptions of FIG. 2, the process of TCP three-way handshake may be clearly understood.

In FIG. 3, a structural schematic view of a window scaling factor option carried by a SYN packet (the SYN bit in a header of the TCP packet being set) sent during TCP three-way handshake is illustrated. In the option structure, the first field "Kind" in the option indicates the type of the option. When Kind=3, the option is indicated to be the window scaling factor option. When the TCP connection is initialized, the two communication participators use such option to negotiate the scaling factor of the receive window. In the header of the TCP, the receive window size is represented by 16 bits, and thus the maximum receive window size is 65535 bytes. In fact, the receive window size allowable by TCP may need to be far greater than 65535 bytes (to improve the throughput of the TCP communication). The window scaling factor solves such issue. Assume the receive window size in the TCP header is N and the window scaling factor (bit-shifting number) is M, the actual receive window size is equal to N multiplied by $2^M$, namely, N being shifted to the left by M bits. It should be noted that, the value range of M is 0~14.

The second field "Length" in the option structure refers to the total length of the option structure, and the total length include the two bytes occupied by the "Kind" field and the "Length" field.

The option structure further includes a "shift.cnt" field, and the value of the receive window scaling factor (Rcv. Wind. Scale) is the value of the "shift.cnt" field. The value range of shift.cnt is 0~14, that is, the maximum TCP sequence number is defined by $2^{16}*2^{14}=2^{30}<2^{31}$. Such definition is applied to prevent the byte sequence number from overflowing. Further, the receive window scaling factor is an option, and its value may be determined through the SYN packet in the TCP three-way handshake stage. The window scaling factor option carried in a TCP packet whose header is not configured with a SYN bit may be ignored. If the two communication participators both launch window scaling, other than the SYN packet (with a receive window RCV.WND equal to the window size field SEG.WND), RCV.WND values of other TCP packets may be calculated by left shifting the window size field SEG.WND by Rcv.Wind.Scale bits, namely:

$$\text{RCV.WND}=\text{SEG.WND}<<\text{Rcv.Wind.Scale} \quad \text{Equation 1}$$

For example, as described previously, assume the receive window size in the TCP header is N and the window scaling factor (bit-shifting number) is M, the actual receive window size of the TCP segment is thus N multiplied by $2^M$, namely, N left shifted by M bits.

Often, the variation of the RCV.WND value of the TCP connection is smooth, and a jump may not occur (the so-called "jump" means a new value being 1.5 times or more greater than a previous value). By utilizing such feature, a TCP receive window reference table recording an actual RCV.WND may be established, and by determining whether a receive window of a TCP packet satisfies the table, whether the TCP packet is a forged TCP packet may be determined. It should be noted that, the actual RCV.WND here is the RCV.WND of the packet corresponding to the TCP second handshake <SYN, ACK>.

The TCP receive window reference table is often configured in a gateway device. It should be understood that, the gateway device here may be a safety device such as a safety detection device or a firewall. In one implementation, the TCP receive window reference table may be established based on the RCV.WND obtained in the TCP second handshake <SYN, ACK>. The TCP receive window reference table may include major information such as a TCP connection tetrad (source IP, source port, destination IP, destination port), an actual TCP receive window 'RCV.WND', and a TCP receive window scaling factor 'Rcv.Wind.Scale'. It should be noted that the information stored in the receive window reference table is information related to the actual host.

In FIG. 4, a structural schematic view of data recorded in a TCP receive window reference table is specifically illustrated according to embodiments of the present disclosure. As shown in FIG. 4, the reference table includes the following fields:

the "Key value" field (optional), representing a hash value calculated based on the TCP connection tetrad for convenient and rapid search;

the "connection tetrad" field, including the source IP, the source port, the destination IP, and the destination port;

the "actual receive window" field, representing that the actual RCV.WND value of the TCP connection, where such value may be obtained from the window size field SEG.WND of the packet corresponding to the TCP second handshake <SYN, ACK>;

the "receive window scaling factor" field, representing the receive window scaling factor (Rcv.Wind.Scale) of the TCP connection, which may be obtained from the field "shift.cnt" in the window scaling factor option carried by the packet corresponding to the TCP second handshake <SYN, ACK>; and the "creation time" field (optional), representing the creation time of the table.

After a detailed introduction of the structure of the data recorded in the TCP receive window reference table, how to establish and update a record in the TCP receive window reference table will be illustrated in detail hereinafter with reference to FIG. 5 according to embodiments of the present disclosure.

Figure 5:
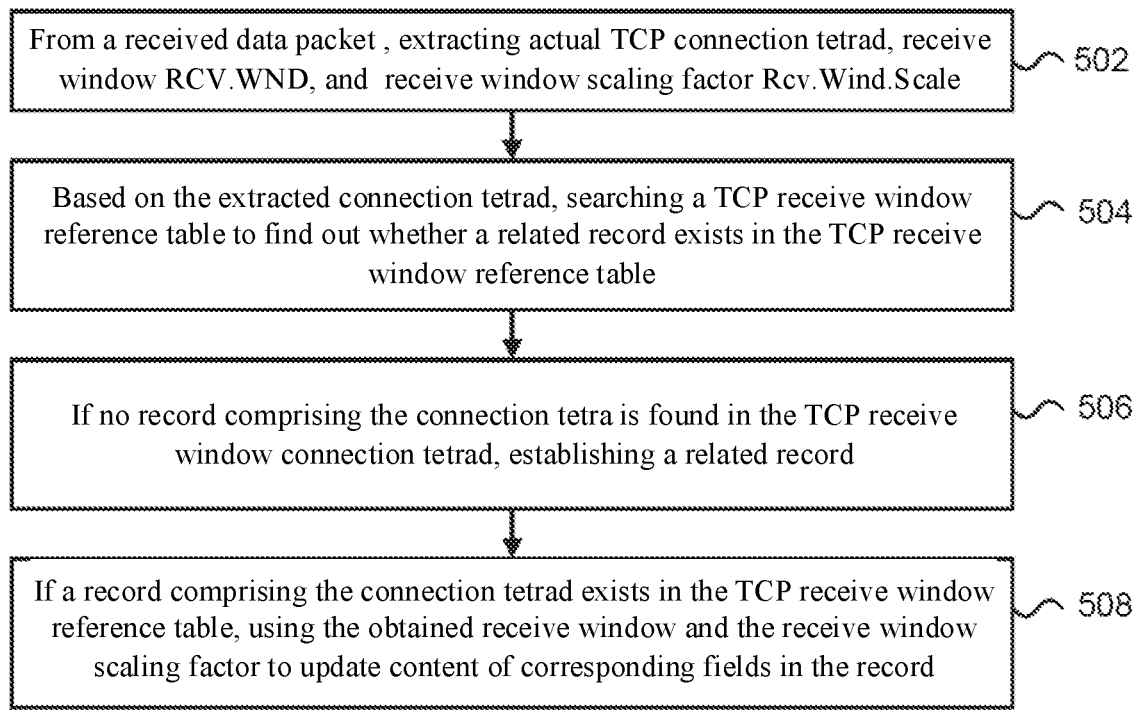
FIG. 5 illustrates a flowchart of a method for establishing and/or updating a TCP receive window reference table according to embodiments of the present disclosure.

FIG. 5 illustrates a flowchart of a method for establishing and/or updating a TCP receive window reference table according to embodiments of the present disclosure. It should be understood that, the method may be applied to network devices such as a gateway device, a firewall, and a router. Further, it should be understood that updating the TCP receive window reference table includes operations such as adding, deleting, and modifying records in the reference table. The method may include the following steps:

Step 502, from a received packet corresponding to a TCP second handshake <SYN, ACK>, extracting an actual TCP connection tetrad, a receive window value (i.e., RCV.WND value, obtained from a window size field SEG.WND), and a receive window scaling factor (i.e., Rcv.Wind.Scale, obtained from a "shift.cnt" field in a window scaling factor option, and if there is no window scaling factor option, the default value is 0);

Step 504, based on the extracted connection tetrad, searching a TCP receive window reference table to determine whether a related record exists in the TCP receive window reference table;

Step 506, if no record comprising the connection tetrad is found in the TCP receive window reference table, based on the obtained TCP connection tetrad, the receive window, and the receive window scaling factor, establishing a related record in the TCP receive window reference table; and Step 508, if a record comprising the connection tetrad exists in the TCP receive window reference table, using the obtained receive window and the receive window scaling factor to update content of corresponding fields in the record, where, optionally, the field of "creation time" may be updated.

Further, in another embodiment, to save the storage space, old records showing a creation time relatively long time ago with respect to current time may be periodically deleted in the TCP receive window reference table.

Further, in another embodiment, to speed up a searching rate, the key value calculated from the TCP connection tetrad may be applied to search through the TCP receive window reference table.

After establishment of the TCP receive window reference table is completed, when a gateway device receives a TCP packet (excluding the SYN packet), a TCP receive window reference table may be searched based on the connection tetrad of the TCP packet. If a record comprising the same connection tetrad exists, the RCV.WND of the TCP packet may be compared with the receive window in the related record to obtain a deviation therebetween. If the deviation exceeds a preset threshold, the TCP packet may be suspected to be a forged TCP packet. Hereinafter, such process is illustrated in detail with reference to FIG. 6.

Figure 6:
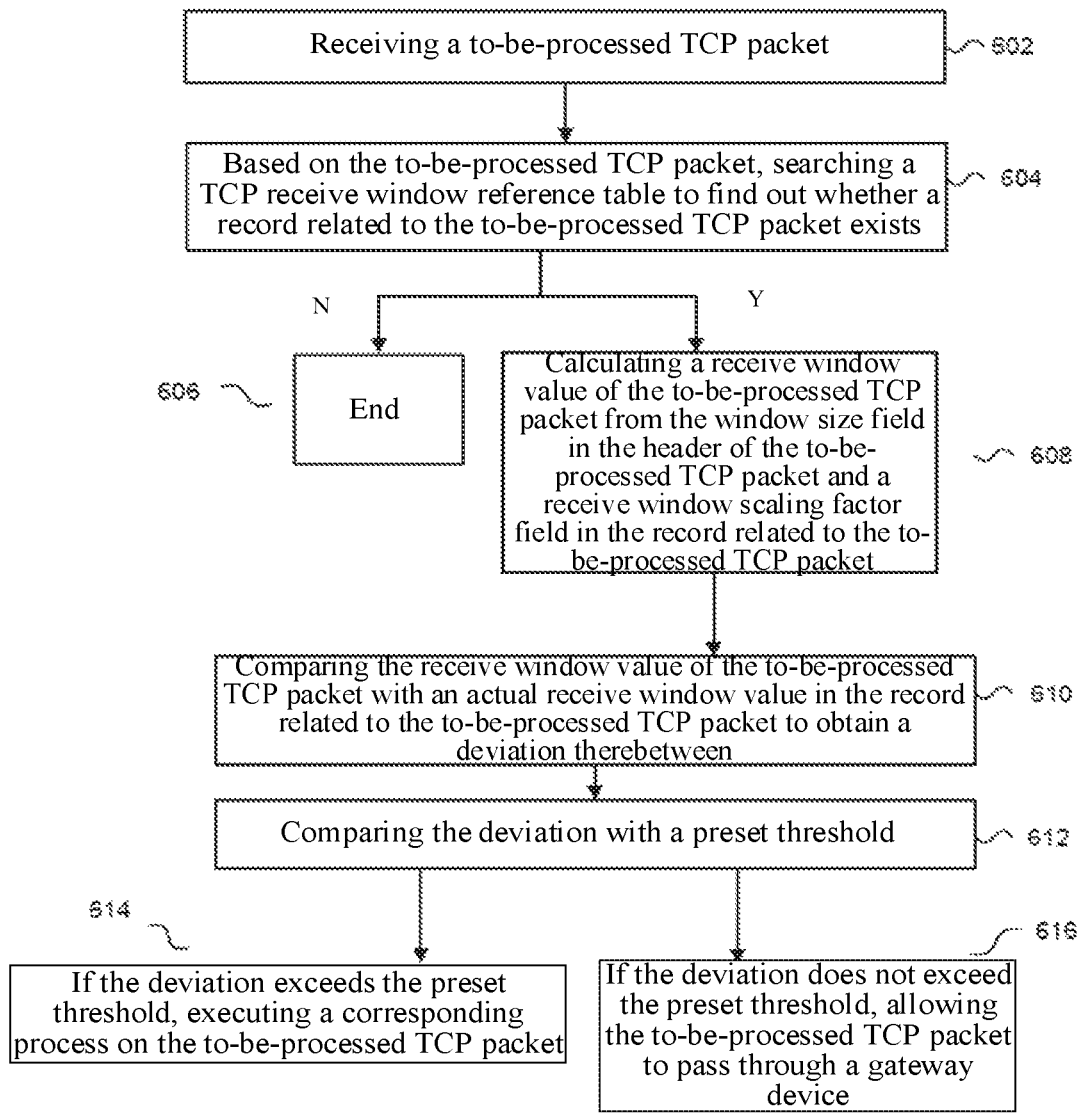
FIG. 6 illustrates a flowchart of a method for processing a forged TCP packet according to embodiments of the present disclosure.

As shown in FIG. 6, a flowchart of a method for processing a forged TCP packet is illustrated according to embodiments of the present disclosure, and the method comprises the following steps:

Step 602, receiving a to-be-processed TCP packet (excluding the SYN packet), where a header of the to-be-processed TCP packet includes a window size field SEG.WND;

Step 604, based on the to-be-processed TCP packet (e.g., a connection tetrad in the to-be-processed TCP packet), searching a TCP receive window reference table to find out whether a record related to the to-be-processed TCP packet, such as a related record comprising the same connection tetrad, exists;

Step 606, if no related record comprising the same connection tetrad exists in the TCP receive window reference table, the process is terminated;

Step 608, if a related record including the same connection tetrad exists in the TCP receive window reference table, calculating a receive window (RCV.WND) value of the to-be-processed TCP packet from the window size field SEG.WND in the header of the to-be-processed TCP packet and from a receive window scaling factor field Rcv.Wind.Scale in the related record, where, more specifically, the receive window value RCV.WND of the to-be-processed TCP packet is calculated from the window size field SEG.WND in the header of the to-be-processed TCP packet and the receive window scaling factor field Rcv.Wind.Scale in the related record according to equation 1;

Step 610, comparing the RCV.WND value of the to-be-processed TCP packet with an actual RCV.WND value in the related record to obtain a deviation therebetween, where, more specifically, the deviation is calculated by dividing the RCV.WND value of the to-be-processed TCP packet by the actual RCV.WND value in the related record; and Step 612, comparing the deviation with a preset threshold.

If the deviation exceeds the preset threshold, the to-be-processed TCP packet may highly likely be a forged TCP packet, and the method is jumped to Step 614 to execute a corresponding process on the to-be-processed TCP packet, for example, the to-be-processed packet may be discarded directly, or a related notice may be provided to a user to ask the user to further determine whether the to-be-processed TCP packet is true or forged, etc.

If the deviation does not exceed the preset threshold, the to-be-processed TCP packet is regarded as a true TCP packet. Thus, Step 616 is entered to allow the to-be-processed TCP packet to pass the gateway device directly.

It should be noted that, to avoid discarding an effective TCP packet as the forged TCP packet, optionally, "the preset threshold" refers to the times of the RCV.WND of the TCP packet with respect to the actual RCV.WND in the related record. Based on tests, the value range of the "preset threshold" may be ≥1.5. For example, the preset threshold may be 1.5, and when the deviation exceeds 1.5, the TCP packet may be preliminarily determined to be a forged TCP packet. In some embodiments, the "preset threshold" may be 4. Correspondingly, when the deviation exceeds 4, the TCP packet may be determined to be a forged TCP packet. As such, the "preset threshold" may allow the determination of the TCP forged packet to be more accurate. The aforementioned times is for illustrative purposes only, and is not intended to be limiting. The user may adjust the standard of the "preset threshold" based on actual situations, thereby adapting to different context environmental demands.

As such, in solutions of the present disclosure, by determining whether a relatively large deviation exists between the receive window of the to-be-processed TCP packet and the actual receive window of the related record in the TCP receive window reference table, there is a higher chance to find (and further discard) the forged TCP packets. Accordingly, the device may receive as few attacks from the forged TCP packets as possible.

Solutions of the present disclosure may not only be applied to firewall, DDoS (distributed denial of service) gateway system, and by-passed detection system such as IDS (intrusion detection system), but may also be applicable for use in a router.

The foregoing are merely some preferred embodiments of the present disclosure, and are not intended to limit the protection scope of the present disclosure. Without departing from the spirit and principles of the present disclosure, any modifications, equivalent substitutions, and improvements, etc. shall fall within the scope of the present disclosure.

What is claimed is:

1. A method for processing forged TCP packets, comprising:
    receiving a to-be-processed TCP packet, wherein a header of the to-be-processed TCP packet includes a window size field;
    based on the to-be-processed TCP packet, searching a TCP receive window reference table to find out whether a record related to the to-be-processed TCP packet exists;
    when the record related to the to-be-processed TCP packet exists in the TCP receive window reference table, calculating a receive window value of the to-be-processed TCP packet from the window size field in the header of the to-be-processed TCP packet and a receive window scaling factor field in the record related to the to-be-processed TCP packet;
    comparing the receive window value of the to-be-processed TCP packet with an actual receive window value in the record related to the to-be-processed TCP packet to obtain a deviation therebetween; and
    comparing the deviation with a preset threshold to determine whether the to-be-processed TCP packet is a forged TCP packet.

2. The method according to claim 1, wherein the comparing the deviation with the preset threshold to determine whether the to-be-processed TCP packet is a forged TCP packet comprises:
when the deviation exceeds the preset threshold, executing a corresponding process on the to-be-processed TCP packet; and
when the deviation does not exceed the preset threshold, allowing the to-be-processed TCP packet to pass through.

3. The method according to claim 1, wherein the receive window value RCV.WND of the to-be-processed TCP packet is calculated by using a following equation:

$$RCV.WND=SEG.WND<<Rcv.Wind.Scale$$

wherein SEG.WND represents a window size field, and Rcv.Wind.Scale represents the receive window scaling factor field.

4. The method according to claim 1, wherein records in the TCP receive window reference table comprise:
a "connection tetrad" field, including a source IP, a source port, a target IP, and a target port;
an "actual receive window" field, representing an actual receive window value of a TCP connection, wherein the actual receive window value is obtained from a window size field of a packet corresponding to a TCP second handshake; and
a "receive window scaling factor" field representing a receive window scaling factor of the TCP connection, wherein the receive window scaling factor is obtained from a "shift.cnt" field in a window scaling factor option carried by the packet corresponding to the TCP second handshake.

5. The method according to claim 4, wherein the records in the TCP receive window reference table further includes following fields:
an optional "Key value" field, representing a hash value calculated based on the connection tetrad of the TCP connection, for convenient and rapid search; and
an optional "creation time" field, representing a creation time of a corresponding record.

6. The method according to claim 4, wherein the based on the to-be-processed TCP packet, searching the TCP receive window reference table to find out whether the record related to the to-be-processed TCP packet exists comprises:
based on a connection tetrad of the to-be-processed TCP packet, searching the TCP receive window reference table to find out whether the record related to the to-be-processed TCP packet exists.

7. The method according to claim 5, wherein the based on the to-be-processed TCP packet, searching the TCP receive window reference table to find out whether the record related to the to-be-processed TCP packet exists comprises:
using a harsh value calculated by the connection tetrad of the to-be-processed TCP packet as a query condition to compare with a key value in the TCP receive window reference table to find out whether the record related to the to-be-processed TCP packet exists.

8. The method according to claim 4, wherein the records in the TCP receive window reference table is established through following steps:
from a received packet corresponding to the TCP second handshake, extracting connection tetrad, receive window value, and receive window scaling factor, wherein when there is no window scaling factor option, default value of the window scaling factor is 0; and
based on the connection tetrad of the received packet, searching the TCP receive window reference table to find out whether a record related to the received packet exists in the TCP receive window reference table,
wherein when the record comprising the connection tetrad does not exist in the TCP receive window reference table, based on the connection tetrad, the receive window value, and the receive window scaling factor of the received packet, establishing the record related to the received packet in the TCP receive window reference table, and
when the record comprising the connection tetrad exists in the TCP receive window reference table, using the receive window value and the receive window scaling factor of the received packet to update content of corresponding fields in the record, and updating the creation time field.

9. The method according to claim 2, wherein when the deviation exceeds a preset threshold, the executing a corresponding process on the to-be-processed TCP packet further comprises:
directly discarding the to-be-processed TCP packet; or
providing a related notice, to help a user further determine whether the to-be-processed TCP packet is a forged packet or not.

10. The method according to claim 1, wherein:
the deviation is defined by times, which is obtained by dividing the receive window value of the to-be-processed TCP packet by the actual receive window value in the record related to the to-be-processed TCP packet; and
the preset threshold refers to times of the receive window value of the to-be-processed packet with respect to the actual receive window value in the record related to the to-be-processed TCP packet, wherein a value range of the preset threshold is $\geq 1.5$, and preferably, $\geq 4$.

11. The method according to claim 5, wherein:
based on the creation time field in the TCP receive window reference table, an old record showing a creation time relatively long time ago with respect to a current moment is periodically deleted in the TCP receive window reference table.

12. The method according to claim 1, wherein when the record related to the to-be-processed TCP packet does not exist in the TCP receive window reference table, the to-be-processed packet is allowed to pass through.

13. A system for processing forged TCP packets, comprising:
a device for receiving a to-be-processed TCP packet, wherein a header of the to-be-processed TCP packet includes a window size field;
the device for, based on the to-be-processed TCP packet, searching a TCP receive window reference table to find out whether a record related to the to-be-processed TCP packet exists;
the device for, when the record related to the to-be-processed TCP packet exists in the TCP receive window reference table, calculating a receive window value of the to-be-processed TCP packet from the window size field in the header of the to-be-processed TCP packet and a receive window scaling factor field in the record related to the to-be-processed TCP packet;
the device for comparing the receive window value of the to-be-processed TCP packet and an actual receive window value in the record related to the to-be-processed TCP packet to obtain a deviation therebetween; and the device for comparing the deviation with a preset threshold to determine whether the to-be-processed TCP packet is a forged TCP packet.

14. The system according to claim 13, wherein using a comparison result obtained by the device for comparing the deviation with the preset threshold to determine whether the to-be-processed TCP packet is a forged TCP packet comprises:
   when the deviation exceeds the preset threshold, executing a corresponding process on the to-be-processed TCP packet;
   when the deviation does not exceed the preset threshold, allowing the to-be-processed TCP packet to pass through.

15. The system according to claim 13, wherein records in the TCP receive window reference table comprises:
   a "connection tetrad" field, including a source IP, a source port, a target IP, and a target port;
   an "actual receive window value" field, representing an actual receive window value of a TCP connection, wherein the actual receive window value is obtained from the window size field of a packet corresponding to a TCP second handshake; and
   a "receive window scaling factor" field representing a receive window scaling factor of the TCP connection, wherein the receive window scaling factor is obtained from a "shift.cnt" field in a window scaling factor option carried by the packet corresponding to the TCP second handshake.

16. The system according to claim 15, wherein the records in the TCP receive window reference table further includes following fields:
   an optional "Key value" field, representing a hash value calculated based on the connection tetrad of the TCP connection, for convenient and rapid search; and
   an optional "creation time" field, representing a creation time of a corresponding record.

17. The system according to claim 15, wherein the record in the TCP receive window reference table is established through following steps:
   from a received packet corresponding to the TCP second handshake, extracting connection tetrad, receive window value, and receive window scaling factor, wherein when there is no window scaling factor option, default value of the window scaling factor is 0; and
   based on the connection tetrad of the received packet, searching the TCP receive window reference table to find out whether a record related to the received packet exists in the TCP receive window reference table,
      wherein when the record comprising the connection tetrad does not exist in the TCP receive window reference table, based on the connection tetrad, the receive window value, and the receive window scaling factor of the received packet, establishing the record related to the received packet in the TCP receive window reference table, and
      when the record comprising the connection tetrad exists in the TCP receive window reference table, using the receive window value and the receive window scaling factor of the received packet to update content of corresponding fields in the record, and updating the creation time field.

* * * * *